(12) United States Patent
Blackburn et al.

(10) Patent No.: US 8,413,161 B2
(45) Date of Patent: *Apr. 2, 2013

(54) WORK QUEUE SELECTION ON A LOCAL PROCESSOR WITHIN A MULTIPLE PROCESSOR ARCHITECTURE

(75) Inventors: Robert A. Blackburn, Hopewell Junction, NY (US); Robert O. Dryfoos, Hopewell Junction, NY (US); Mark Gambino, Brewster, NY (US); Michael J. Shershin, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 633 days.

This patent is subject to a terminal disclaimer.

(21) Appl. No.: 12/569,554

(22) Filed: Sep. 29, 2009

(65) Prior Publication Data
US 2011/0078696 A1 Mar. 31, 2011

(51) Int. Cl.
*G06F 9/46* (2006.01)
*G06F 3/00* (2006.01)
(52) U.S. Cl. .......................... 718/105; 710/54
(58) Field of Classification Search .................. None
See application file for complete search history.

(56) References Cited

U.S. PATENT DOCUMENTS

| | | | | |
|---|---|---|---|---|
| 6,128,642 | A | * | 10/2000 | Doraswamy et al. .......... 709/201 |
| 6,993,602 | B2 | * | 1/2006 | Merrill et al. .................... 710/54 |
| 2009/0234908 | A1 | * | 9/2009 | Reyhner et al. ................ 709/203 |

OTHER PUBLICATIONS

Non-Final Office Action dated Apr. 26, 2012 received for U.S. Appl. No. 12/569,554.

* cited by examiner

*Primary Examiner* — Jennifer To
*Assistant Examiner* — Wissam Rashid
(74) *Attorney, Agent, or Firm* — Fleit Gibbons Gutman Bongini & Bianco PL; Jeffrey Giunta

(57) ABSTRACT

A method and system is disclosed for selecting a work queue associated with a processor within a multiple processor architecture to assign a new task. A local and a remote queue availability flag is maintained to indicate a relative size of work queues, in relationship to a mean queue size, for each processor in a multiple processor architecture. In determining to which processor to assign a task, the processor evaluates its own queue size by examining its local queue availability flag and evaluates other processor's queue sizes by examining their remote queue availability flags. The local queue availability flags are maintained asynchronously from task assignment. Remote flags are maintained at time of task assignment. The presented algorithm provides improved local processor queue size determinations in systems where task distribution processes execute with lower priorities that other tasks.

20 Claims, 6 Drawing Sheets

WORK QUEUE SELECTION ON A LOCAL PROCESSOR WITHIN A MULTIPLE PROCESSOR ARCHITECTURE

FIELD OF THE INVENTION

The present invention generally relates to dispatching tasks in a multiple processor computing architecture, and more particularly relates to accurately determining computing processor pending process queue size on a local processor executing task distribution processing.

BACKGROUND OF THE INVENTION

Processors used in computing systems, such as Central Processing Units (CPUs), often maintain several task queues to manage tasks that are currently executing and that are awaiting execution by that processor. These multiple task queues are able to, for example, store tasks of different priorities in which tasks in a higher priority queue are serviced by the processor prior to tasks in lower priority queues. One example of multiple queues that represent different processing priority levels is a processor that maintains a high priority queue referred to as an "in progress work queue" that contains processes that are ready to begin processing as well as processes that have already begun to begin processing. Another queue, the "new message queue," stores, for example, messages received from a network that specify tasks that are to be executed. In operation, tasks in the high priority "in progress work queue" are serviced by the processor prior to processing messages in the "new message queue." As a result, the in progress work queue is empty when messages from the new message queue are processed and generate new tasks to distribute to a processor within a multiple processor architecture. A common metric to determine processor loading and therefore which processor to assign a new task is the size of a processor's associated in progress queue.

Processors incorporated in multiple processor architectures, such as a Symetric Multiple Processor (SMP) server, are assigned tasks by a task distribution process or similar process. In an example, a task distribution process receives a task specification in a network message received through a network interface. Depending upon the network communications processing architecture of the multiple processor server, the task distribution process is able to execute on one designated processor to process all messages, or alternative architectures allow any processor within the multiple processors to execute the task distribution process. When a processor processes a network message specifying a task to be assigned to a processor, that processor examines the processing loads of all processors of the multiple processor architecture and determines which processor is most lightly loaded. The task is then assigned to the most lightly loaded processor.

Some processing architectures operate by executing the task distribution process in response to processing newly received network messages. Newly received network messages are processed from the new message queue, which has a lower priority than the in progress work queue. Since the messages in the new message queue, which trigger the task distribution processes, are selected for processing when there are no tasks in the in progress work queue, determinations by the task distribution process of the size of the in progress work queue for the processor executing the task distribution process are generally misleading and are lower than the actual short time average size of the in progress work queue that should be used to determine processor loading. Because the number of tasks in the in progress work queue is the quantity that is used to determine the processing load of a processor, the task distribution process generally uses an inaccurate, and misleading low, measure of the processing load of the processor that is executing the task distribution process. As a result, the task processor often inaccurately detects an inaccurately low processing load for the processor on which it is executing and assigns more tasks to its own processor as a result. This causes an inefficient distribution of tasks among the multiple processors of a multiple processor architecture and inefficiently provides too many tasks to the processor executing the task distribution process. This unequal distribution of tasks is particularly prevalent in architectures that use one processor of a multiple processor architecture to process all network messages, and therefore distributes tasks to the multiple processors.

Therefore, the efficiency of multiple processor computing systems is able to be improved by a more accurate processor loading measurement technique is used for processors executing a task distribution process in a multiple processor architecture.

SUMMARY OF THE INVENTION

In one embodiment, a method for selecting a work queue associated with a processor within a multiple processor architecture to assign a new task includes determining, on a local processor based on at least one queue availability flag associated with a selected processor, an availability of a work queue associated with the selected processor to accept a new task. The local processor and the selected processor are within a multiple processor architecture and access a shared random access data memory. The method further includes assigning, in response to determining the availability, the new task to the work queue associated with the selected processor. The method additionally includes determining that the selected processor is the local processor; adjusting, in response to determining that the selected processor is not the local processor, the at least one queue availability flag based upon a size of the work queue associated with the selected processor; and not adjusting, in response to determining that selected processor is the local processor, the at least one queue availability flag.

In another embodiment, a system for selecting a work queue associated with a processor within a multiple processor architecture to assign a new task include a plurality of processors and a shared random access data memory communicatively coupled to the plurality of processors. The system also includes a task distribution processor that determines, on a local processor based on at least one queue availability flag associated with a selected processor, an availability of a work queue associated with the selected processor to accept a new task. The local processor and the selected processor are within a multiple processor architecture and access a shared random access data memory. The task distribution processor also assigns, in response to determining the availability, the new task to the work queue associated with the selected processor. The task distribution processor additionally determines that the selected processor is the local processor and adjusts, in response to determining that the selected processor is not the local processor, the at least one queue availability flag based upon a size of the work queue associated with the selected processor; and does not adjust, in response to determining that selected processor is the local processor, the at least one queue availability flag.

In another embodiment, a computer program product for selecting a work queue associated with a processor within a multiple processor architecture to assign a new task includes a computer readable storage medium having computer readable program code embodied therewith. The computer readable program code includes computer readable program code configured to determine, on a local processor based on at least one queue availability flag for a selected processor within a multiple processor architecture where each processor in the multiple processor architecture shares a shared random access data memory, an availability of a work queue associated with the selected processor to accept a new task. The selected processor is within the plurality of processors. The computer readable program code also includes computer readable program code configured to assign, in response to determining the availability, the new task to the work queue associated with the selected processor. The computer readable program code further includes computer readable program code configured to determine that the selected processor is the local processor and computer readable program code configured to adjust, in response to determining that the selected processor is not the local processor, the at least one queue availability flag based upon a size of the work queue associated with the selected processor; and computer readable program code configured to not adjust, in response to determining that selected processor is the local processor, the at least one queue availability flag.

BRIEF DESCRIPTION OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present invention, in which.

DETAILED DESCRIPTION

Figure 1:
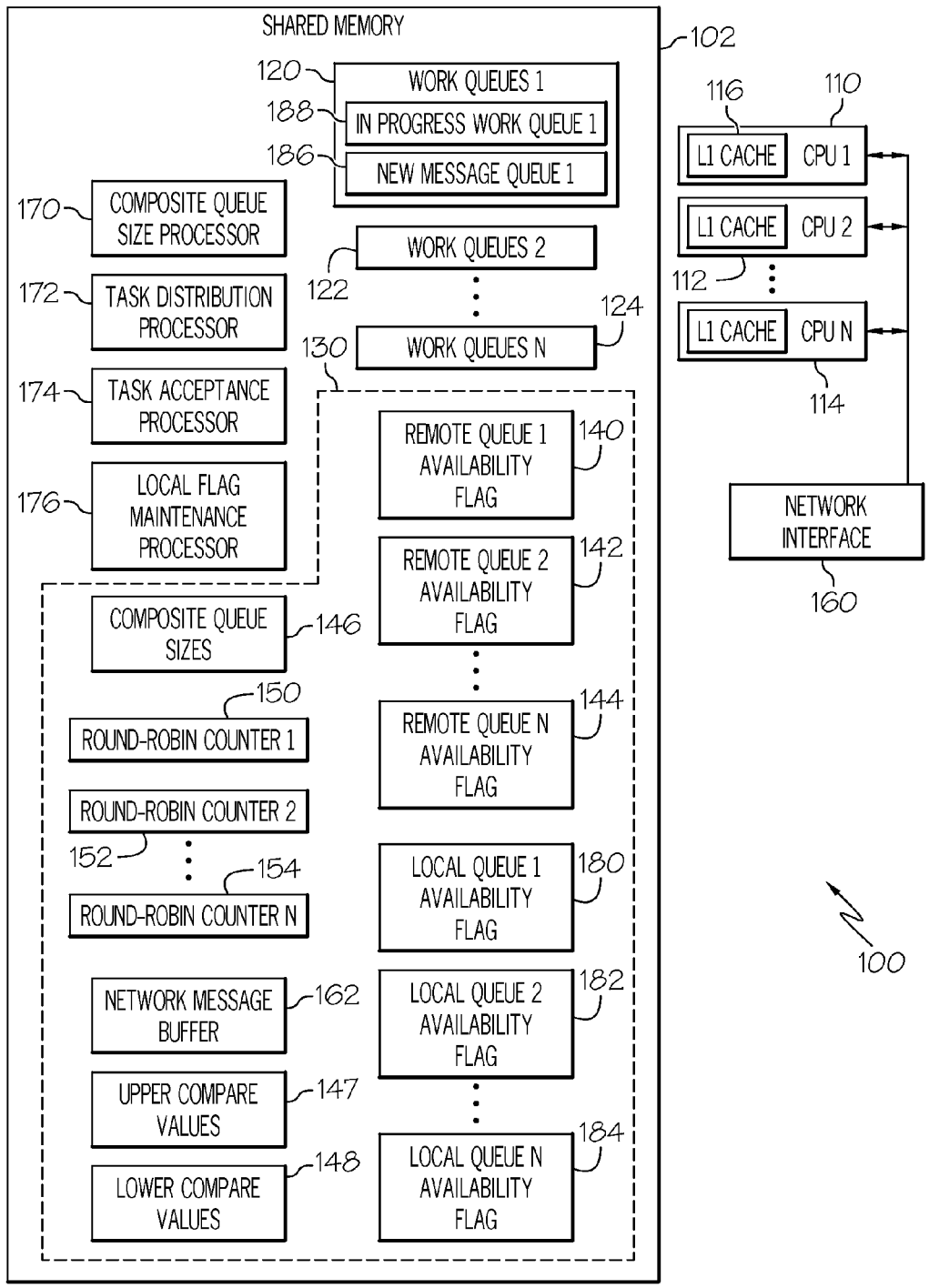
FIG. 1 is a block diagram illustrating a shared memory multiple processor system according to one embodiment of the present invention.

As required, detailed embodiments of the present invention are disclosed herein; however, it is to be understood that the disclosed embodiments are merely examples of the invention, which can be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure and function. Further, the terms and phrases used herein are not intended to be limiting, but rather, to provide an understandable description of the invention.

The terms "a" or "an", as used herein, are defined as one or more than one. The term plurality, as used herein, is defined as two or more than two. The term another, as used herein, is defined as at least a second or more. The terms including and/or having, as used herein, are defined as comprising (i.e., open language). The term coupled, as used herein, is defined as connected, although not necessarily directly, and not necessarily mechanically.

Presented is an algorithm for determining the processing load of a processor executing a task distribution process. One system embodying an example of the presented algorithm is a Symmetric Multiple Processor (SMP) system where all processors access a shared random access memory structure. An example of a system able to incorporate an embodiment of the present invention is described in U.S. patent application Ser. No. 12/569,524, filed by the same inventors as the present invention and which is also commonly assigned and filed on even date as the present application. The contents and teachings of U.S. patent application Ser. No. 12/569,524 are hereby incorporated herein by reference. The presented algorithm is suitable for use in a system such as is described in the above included patent application, however, that system did not introduce or cause the problem with prior art systems addressed by the presented algorithm. The presented algorithm is able to advantageously be applied to any least queue task distribution algorithm and other common dispatcher algorithms operating with queues of differing execution priority levels.

Presented is an algorithm that provides a technique to monitor the processing load of a processor. The presented algorithm monitors the processing load of a processor at various set times and is not synchronized with the execution of the task distribution process. One application of the presented method is in a processing architecture that determines processor loading based upon the number of items in a higher priority processing task queue than the processing task queue from which execution of the task distribution process is triggered. An embodiment of the present algorithm is advantageously used in a multiple processor system incorporating the above described architecture such that tasks are more evenly distributed to all of the processors based upon more accurate determination of the loading of the processor performing the task distribution process.

FIG. 1 is a block diagram illustrating a shared memory multiple processor system 100 according to one embodiment of the present invention. The shared memory multiple processor system 100 includes a number of processors, CPU 1 110, CPU 2 112, and CPU N 114, that access a shared memory 102. Each processor has an associated local cache, indicated for CPU 1 110 as a first level L1 cache 116. As is understood by practitioners of ordinary skill in the relevant arts in light of the present discussion, a local cache such as a first level L1 cache 116 stores data that is able to be rapidly accessed by its associate processor, such as CPU 1 110 in the example of the first level L1 cache 116. In a shared memory system such as is illustrated, the processor associated with a local cache is able to directly access data stored within the local cache if the corresponding data within the stored memory 102 has not been changed. In general, data that is only manipulated by one processor is able to be rapidly and directly accessed by an associated processor without incurring the processing overhead of accessing commonly accessed shared memory.

The shared memory 102 includes a number of sets of work queues, such as work queues 1 120, work queues 2 122, and work queues N 124. Each set of work queues within the shared memory 102 is associated with a respective processor and all tasks in a particular work queue are executed by its associated respective processor. In the illustrated example, CPU 1 110 is associated with the set of work queues 1 120 and only executes tasks placed in the set of work queues 1 120. Similarly, CPU 2 112 is associated with the set of work queues 2 122, and CPU N 114 is associated with the set of work queues N 124.

Each of the illustrated set of work queues has a number of different queues that, for example, contain tasks of differing execution priorities. For example, the set of work queues 1 120 is shown to include an "in progress work queue 1" 188 and a "new message queue 1" 186. Each of the other set of work queues contains a similar plurality of work queues that contain tasks of differing priorities. To simplify the description of the relevant portions of the present invention, the following discussion refers to the "set of work queues" associated with a particular processor as a "work queue" associated with that processor. The following discussion is intended to indicate that placing a task into a "work queue" indicates that the task is assigned to the work queue within the set of work queues for that processor that is conventionally used to assign tasks. Further, following description refers to determining a size of a queue, which is intended to refer to an operating system's conventional techniques for determining the size of a work queue for a particular processor. In one embodiment, tasks assigned by a task distribution process are placed in the higher priority in progress work queue and the processing load of a processor used to determine which processor to assign a new task is based on a size of the in process work queue for that processor.

Each work queue in each set of work queues is able to accept tasks that are to be processed by its associated processor. In one embodiment of the present invention, any processor is able to place a task in any work queue, thereby causing the processor associated with that work queue to process that task. In order to simplify the description of the present invention, this discussion refers to two work queues being contained in each set of work queues associated with each processor. It is clear that any number of work queues is able to be contained in the set of work queues associated with each processor.

The shared memory 102 further stores values of composite queue sizes 146. The task distribution process of one embodiment determines processing loading with respect to tasks of a particular priority by iteratively determining, for each work queue priority within the set of work queues, a composite queue size. For example, a separate mean queue size is calculated and stored in the composite queue sizes 146 for each priority level queue. In the above example where each set of work queues includes an in progress work queue and a new message queue, the composite queue sizes stores a composite queue size for all of the in progress work queues and a separate composite queue size for all of the new message queues.

One embodiment of the present invention iteratively determines composite queue size values as a mean value of the number of tasks that are in each type of work queue in all of the work queues, such as the separate queues of different execution priority within the set of work queues 1 120, set of work queues 2 122, and set of work queues N 124. Further embodiments are able to use any value that represents an average, mean, or any quantity reflective of the number of tasks assigned to each type of work queues within the set of work queues of the multiple processor computing system. Further embodiments are also able to determine sizes of work queues, upon which the composite queue size is based, by weighing tasks within the work queues according to suitable quantities, such as an estimated amount of resources that will be required by that task. In one embodiment, the composite queue sizes are iteratively determined, and therefore updated, at time intervals that are much longer than the anticipated period of distributing tasks to the processors. As such, the value stored in shared memory 102 for the composite queue size 146 will often be stored in the local cache of each processor and will therefore often be accessible to each processor without the processing overhead of general shared memory access.

As is further described below, one embodiment defines separate upper compare values 147 and lower compare values 148 for each of the types of queues within the set of queues. In the above described example that has an in progress work queue and a new message queue for each processor, a separate upper compare value is calculated for each of the in progress work queues and the new message work queues. Similarly, a separate lower compare value is calculated for each of the in progress work queue and the new message work queue. These values are all computed and stored in shared memory as the upper compare values 147 and the lower compare values 148, respectively, in one embodiment in conjunction with the calculation of the above described composite queue sizes.

The shared memory 102 further stores a number of queue availability flags 130. One embodiment includes a separate pair of queue availability flags that are associated with the set of queues that are associated with each processor. Since a particular pair of queue availability flags is associated with a particular set of queues, and that particular set of queues is associated with a particular processor, the following discussion refers to particular queue availability flags being associated with a particular processor. The association of a queue availability flag with a particular processor is understood to refer to the queue availability flags being associated with a set of queues that are in turn associated with that particular processor.

In one embodiment, the pair of queue availability flags includes a local queue availability flag and a remote queue availability flag. In the illustrated example, set of work queues 1 120 has an associated remote queue 1 availability flag 140 and a local queue 1 availability flag 180. The set of work queues 2 122 has an associated remote queue 2 availability flag 142 and a local queue 2 availability flag 182. The set of work queues N 124 has an associated remote queue N availability flag 144 and a local queue N availability flag 184. The separate use of the local queue availability flags and the remote queue availability flags is described in detail below.

In one embodiment, each queue availability flag, such as the queue 1 availability flag 140, the queue 2 availability flag 142, and the queue N availability flag 144 are each stored in a separate cache line. As is understood by practitioners of ordinary skill in the relevant arts in light of the present discussion, increasing the amount of time that valid queue availability flag data is stored in each processors local cache is improved by storing each processor's queue availability flag in a separate section of memory such that updating one CPU's queue availability flag does not invalidate the value of other CPUs' queue availability flags that are stored in the local caches of the multiple processors. In an example of processors using a memory cache line of 256 bytes, groups of 256 bytes are stored in the memory caches, (such as the L1 cache of CPU's 110). If CPU 1 has 256 bytes in its L1 cache and then another CPU updates any of those 256 bytes, all 256 bytes are removed from CPU 1's L1 cache. The operation of one embodiment of the present invention does not flush other queue availability flags, such as queue 2 availability flag 142, when one of the processor availability flags, such as queue 1 availability flag 140, is updated. One embodiment therefore stores the availability queue availability flag for each CPU in its own memory cache line, e.g., it resides in its own 256-byte area.

In the following discussion, reference to a "local processor" refers to the processor that is executing the subject process, usually the task distribution process. A "remote processor" refers to any other processor than the processor executing the subject process. All processors, i.e., the local processor and remote processors, are able to be included within the multiple processors of an SMP server, such as the CPUs illustrated in FIG. 1.

Each pair of queue availability flags in one embodiment is associated with a respective set of work queues and indicates an ability of the associated set of work queues to accept a new task. In one embodiment, each queue availability flag is assigned one of two values. A first value is referred to as "green" and indicates that the associated work queue is available to accept a task. A second value is referred to as "red" and indicates that the associated work queue is unavailable to accept a task. In one embodiment, as described in further detail below, the determination that a particular work queue is able to accept a new task is based upon a comparison of a value related to the composite queue size 146 to the size of the particular work queue. Various embodiments of the present invention are able to use different values for the size of a particular work queue, such as a raw count of entries in the work queue, a weighted count of entries where each entry is weighted by an estimated amount of resources expected to be consumed by the entry, and similar values.

The present discussion describes the queue availability flags as indicating an availability or unavailability of a work queue to accept new tasks. These terms are used to describe the comparative state of work queues as determined by the below described processing of one embodiment of the present invention. It is clear that although a work queue is indicated as "unavailable" to accept new tasks, it is possible to place new tasks into that work queue. The processing of various embodiments are able to include processing that will place tasks in work queues when the queue availability flag indicates that the work queue is "unavailable," such as to handle a condition when all work queues are indicated as being "unavailable."

The shared memory 102 stores a number of operating programs that are executed by, for example, the CPU 1 110, CPU 2 112, and CPU N 114. Operating programs stored in the stored memory 102 include, for example, a composite size processor program 170, a task distribution processor program 172, a task acceptance processor program 174, and a local flag maintenance processor program 176. The processing of these operating programs is described in detail below.

The multiple processor computing system 100 creates tasks that are to be assigned to and processed by the multiple processors, such as CPU 1 110, CPU 2 112, and CPU N 114. One source of tasks to be assigned to the various processors is through network messages received from a network interface 160 and placed into a network message buffer 162. Various embodiments of a multiple processor computer system 100 process network messages received by network interface 160 and stored in the network message buffer either by one dedicated processor or by any of the processors based upon, for example, round-robin processing or processing availability.

The following description describes processing used to determine which work queue, and therefore which processor, to assign new tasks. One embodiment of the present invention includes a set of queues for each processor that includes two queues with different priority levels, an in progress queue and a new message queue. These two different queues within the set of queues are referred to herein as two types of queues. Further embodiments are able to include any number of queues with different priority levels and therefore any number of types of queues. In determining to assign a new task, it is understood that an initial determination is made as to which type of queue, e.g., which priority level queue, the new task is to be assigned. The below described processing uses different queue characterization values for each type of queue. For example, references to composite queue size, upper compare value, lower compare value, and the like all refer to the value of those quantities that correspond to the type of queue to which a new task is to be added. In order to simplify the description of the present invention, the following description is based on an example embodiment where new tasks are to be added to the in progress work queue of a selected processor, and the associated flags are all referenced to the relative sizes of the in process queues within the sets of queues. It is understood that the principals of the following description are expandable to determining relative sizes of the multiple queues within the sets queues.

One embodiment of the present invention allows any processor to place tasks, such as are generated in response to received network messages, in its own work queue or the work queue of any other processor. As described in further detail below, when a particular processor has a task to assign to a processor, that particular processor identifies a queue availability flag that is green. When a green queue availability flag is identified, the particular processor places the task into the work queue associated with the identified green queue availability flag. As described below, the processing examines either a remote queue availability flag for processors other than the local processor executing the task distribution process, or a local queue availability flag for the particular local processor executing the task distribution process. In the case of adding a task to the work queue of a remote processor, the particular processor then determines the size of the work queue to which the task was just added and determines if that work queue is unavailable and if the availability of the work queue has changed, the particular processor updates the associated queue availability flag. As is also further described below, the process that adds a task to the work queue of the local processor only alters the remote queue availability flags for that processor and does not alter the local queue availability flags of that processor.

A particular processor of one embodiment of the present invention determines the processor to which to assign a new task based in part on a round-robin counter. In such embodiments, shared memory 102 stores a separate round robin counter for each processor. In the illustrated example, shared memory 102 stores a round-robin counter 1 150, a round-robin counter 2 152, and a round-robin counter N 154. Each of these round-robin counters is associated with a respective processor such that, for example, only CPU 1 110 uses round-robin counter 1 150, only CPU 2 112 uses round-robin counter 2 152, and so forth. Such a construction results in the round-robin counter value being stored in the local cache for that processor and, since it is never changed by other processors, the value is never required to be updated in the shared memory 102 and exchanged with other processors. This construction obviates the processing overhead of sharing a common round-robin value through shared memory with multiple processors, as is performed by conventional task distribution architectures.

The first queue availability flag examined by a particular processor is selected in one embodiment by adding one the current value of the round-robin counter associated with that particular processor. That round-robin counter is incremented and queue availability flags associated with the incremented values are examined until a green queue availability flag is found.

Figure 2:
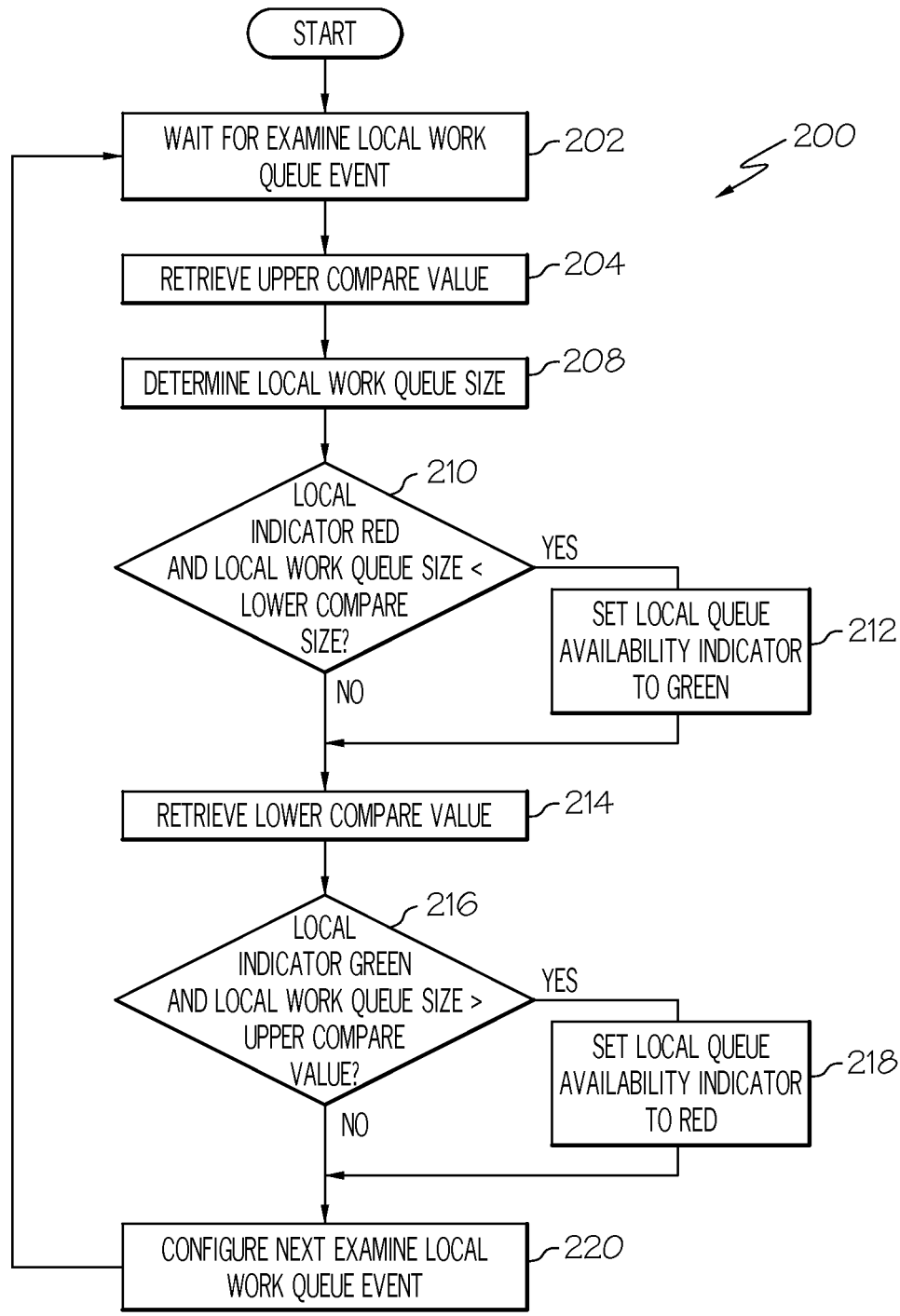
FIG. 2 is a processing flow diagram for updating a local queue availability flag process for a processor of a multiple processor system as shown in FIG. 1, according to one embodiment of the present invention.

FIG. 2 is a processing flow diagram for updating a local queue availability flag process 200 for a processor of a multiple processor system 100 as shown in FIG. 1, according to one embodiment of the present invention. The updating a local queue availability flag process 200 is embodied in one embodiment in a local flag maintenance processor program 176 and maintains the proper value of the local queue availability flag for each processor. The update a local queue availability flag process 200 is executed by all of the processors within the multiple processors of a multiple processing system using shared memory, such as any of CPU 1 110, CPU 2 112 or CPU N 114 as described above. The updating a local queue availability flag process 200 of several embodiments of the present invention is able to be executed iteratively at a fixed or variable interval. Using a variable interval between iterations of the updating a local queue availability flag process 200 is able to avoid synchronizing this process to the timing of some workload bursts and is therefore able to provide a more reliable indication of processor queue availability.

The updating a local queue availability flag process 200 begins by waiting, at 202, for an examine local work queue event. Various embodiments of the present invention utilize different techniques to initiate each iteration of the updating the local queue availability flag process 200. For example, one embodiment is able to use a processor's timing architecture to trigger iterations at a fixed or changing time interval. In one embodiment, a processor's timing interrupt is used to trigger processing at an interval configured by the last execution of the updating the local queue availability flag process 200, as is described below. In one example, the updating the local queue availability flag process 200 is executed at varying intervals of between 10 mS and 50 mS.

The processing of one embodiment determines if the local queue availability flag for the local processor, which indicates if the work queues for the local processor are or are not available to accept new tasks, should be changed based on the work queue size of the work queues associated with the local processor. The processing of one embodiment uses different queue size thresholds to determine if a work queue is available to accept new tasks, i.e., the queue availability flag should be green, and to determine if the work queue is unavailable to accept new tasks, and therefore the queue availability flag should be "red." In this discussion, the threshold to determine if a work queue is available to accept new tasks, i.e., to determine if the queue availability flag should be changed from red to green, is referred to as a "lower compare value 148." The threshold to determine if a work queue is unavailable to accept new tasks, i.e., to determine if the queue availability flag should be changed from green to red, is referred to as an "upper compare value 147." In one embodiment, a mean of work queue sizes for all of the work queues associated with each of the CPUs is used as the basis for both compare values. One embodiment of the present invention uses the same upper compare value 147 and lower compare value 148 to determine the value of local queue availability flags and remote queue availability flags. Further embodiments are able to use different compare values for these different queue availability flags.

The upper compare value 147 in one example is 25% larger than the mean of work queue sizes for all of the work queues associated with each of the CPUs. The lower compare value 148 is set to the mean of work queue size for all of the work queues associated with each of the CPUs. To illustrate with an example is a case where the mean of work queue sizes for all work queues is 12. The upper compare value 147 in this example is 25% higher than 12, or 16. In this example, the upper compare value 147 is determined by "adjusting" the mean queue size by increasing that value by 25%. This example is clearly just one design choice and further embodiments are able to use various suitable quantities to determine if a work queue is available or unavailable to accept new tasks and various embodiments are able to determine one or both of the upper compare value and the lower compare value by applying an adjustment to a mean queue size, or to any other suitable quantity. Various embodiments are further able to use the mean queue size as one of the upper compare value and the lower compare value.

The use of unequal upper compare values 147 and lower compares values 148 reduces the frequency with which the values of those flags will be changed. If the same threshold value were used for both changes of state, the value of the queue availability flag would possibly change each time a task is added or taken from the work queue. This would result in the value of that flag that is in the local caches of other processors to become invalid, and require updating of the other processor's local cache each time that flag is to be updated. Using different values for the upper compare value and lower compare value causes the flag value to be changed much less frequently, and therefore results in valid values being contained in the local caches of all of the multiple processors and greatly reduces the amount of local cache updates required in the course of examining the value of these queue availability flags.

The processing of the updating a local queue availability flag process 200 continues by reading, at 204, the upper compare value for each type of queue in the set of queues. In an example where the set of work queues include an in progress work queue and a network message work queue, a task is determined to be assigned to either the in progress work queue or the new message work queue. The processing of one embodiment reads the upper compare value from the upper compare values 147 associated with each type of queue. In one embodiment, the mean queue size for all of the type of work queues of a particular type is used as a basis for the upper compare value 147, and a fixed percentage increase is added thereto. Further embodiments are able to adjust the composite queue size 146 for each type of queue by any suitable method to derive an upper compare value. The processing determines, at 208, the local work queue sizes of each type of work queue. The processing then determines, at 210, if the local queue availability indicator for this processor is "red," thereby indicating that the queue is unavailable to accept new tasks, and if the local queue size is less than the lower compare size 147. If the local queue size is less than the lower compare size, the local work queue is able to accept new tasks and if the local queue availability indicator is "red," its state should be changed. If these conditions are true, the processing sets, at step 212, the local queue availability indicator to "green."

The processing continues to retrieve, at 214, a lower compare value 148 from shared memory 102 for each type of queue. As described above, the lower compare value 148 in one embodiment is set to the mean queue size for all work queues of a particular type. Further embodiments are able to adjust the composite queue size 146 by any suitable method to derive a lower compare value 148.

The processing then determines, at 216, if the local queue availability indicator for this processor is "green," thereby indicating that the queue is available to accept new tasks, and if the local queue size is greater than the upper compare size. If the local queue size is greater than the upper compare size, the local work queue is unavailable to accept new tasks and if the local queue availability indicator is "green," its state should be changed. If these conditions are true, the processing sets, at step 218, the local queue availability indicator to "red."

It is to be noted that the value of the local queue availability flag is only changed when required and changed values are not required to be updated in the shared memory 102 when the local cache of that processor reuses that location.

The processing continues to configure, at 220, the next examine local work queue event. As discussed above, the execution timing architecture of the processor performing this process is able to be used to configure this event to occur at some time in the future.

Figure 3:
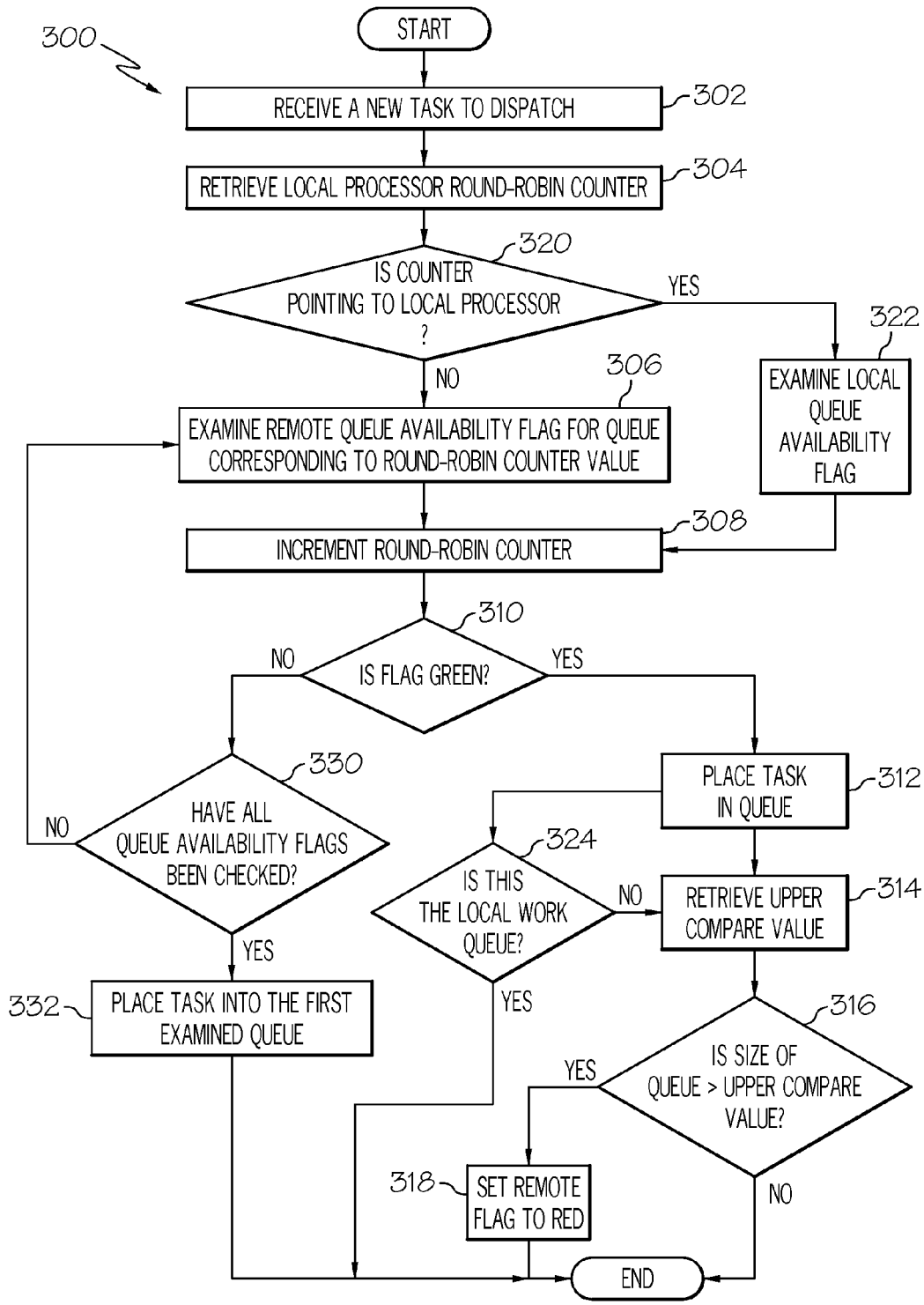
FIG. 3 illustrates a processing flow diagram for dispatching a task to one of a number of processors within a multiple processor system as shown in FIG. 1, according to one embodiment of the present invention.

FIG. 3 illustrates a processing flow diagram for dispatching a task to one of a number of processors within a multiple processor system as is shown in FIG. 1, according to one embodiment of the present invention. The task dispatching processing flow 300 is embodied in one embodiment in a task distribution processor program 172 and is able to be executed by any processor within the multiple processor system 100. The task dispatching processing begins by receiving, at 302, a new task to dispatch. New tasks are able to originate, for example, from a network message received through network interface 160 or are able to be created within a processor within the multiple processor system 100. The processing continues to retrieve, at 304, a local processor round-robin counter associated with the processor executing the task dispatching processing. As described above, one embodiment of the present invention stores in shared memory a separate, local round-robin counter for each processor.

In one embodiment of the present invention, the processing continues to determine, at 320, if the counter value is indicating the queues for the local processor, i.e., the processor executing the task dispatching processing, or the queues for another processor, referred to herein as a remote processor. If the counter value indicates the local processor, the local queue availability flag associated with the processor executing the task dispatching processing is examined, at 322. In an example, if CPU 1 110 is executing the task dispatching processing, the local queue 1 availability flag is examined. If the counter value does not indicate the queues associated with the local processor, the processing continues by examining, at 306, the remote queue availability flag for the work queue represented by the value of the local round-robin counter for the processor distributing the task. In the example of CPU 1 110 executing the task dispatching processing, if the round-robin counter indicates the queues associated with CPU 2, the local queue 2 availability flag is examined.

After examining either the local queue availability flag for the local processor or the remote queue availability flag for a remote processor, the processing then increments, at 308, the local round-robin counter for the processor executing the task dispatching processing. In one embodiment, the round-robin counter is incremented "modulo-N" where "N" is the number of processors in the multiple processor architecture. For example, in a system with five (5) processors, once the round-robin counter is equal to five (i.e., indicates the highest number processor), the round-robin counter is "incremented" by resetting its value to the lowest number processor.

The processing determines, at 310, if the examined queue availability flag is "green," thereby indicating the availability of the work queue associated with the examined queue availability flag to accept a task. If the examined queue availability flag is not green, i.e., it is "red" and indicates that the work queue is indicated as unavailable to accept tasks, the processing to determine, at 330, if all queue availability flags have been checked in this processing to dispatching the new task. If all queues have been checked and the processing has not found any "green" flags, the processing assumes that all flags are "red" and chooses to assign the task to the first queue whose queue availability flag was checked. In one embodiment, if the determination at 330 determines all queue availability flags have not been checked, the processing returns to examining, at 306, the queue availability flag for the next work queue and processing will continue as described above. If all queues have been checked, the processing continues to place, at 332, the task into the queue corresponding to the queue availability flag that was first examined in the first pass through 306.

If the examined queue availability flag was determined to be "green," the processing proceeds to placing, at 312, the task to the work queue associated with the examined queue availability flag that was green.

The processing continues by determining, at 324, if the task was added to a local work queue, i.e., a work queue associated with the processor executing the task dispatching processing. If the task was added to a local work queue, the processing ends.

If it was determined that the task was not added to a local work queue, i.e., it was added to a work queue of a different, remote, processor, the processing of one embodiment retrieves, at 314, the upper compare value 147 for the type of queue that is to receive the new task as was described above.

It is to be noted that the upper compare value 147 is only read during this process and not written, thereby preserving the validity of this value in the local caches of other processors. The processing then continues to determine, at 316, if the size of the work queue associated with the examined queue availability flag that was green, i.e., the work queue into which a task was placed at 312, is greater than the upper compare value. If the size of that work queue is larger than the upper compare value, the remote queue availability flag associated with that work queue is set, at 318, to "red" to indicate that the work queue is not available for accepting new tasks. If that work queue's size is not larger than the upper compare value, the processing ends. It is to be noted that if the size of the work queue does not exceed the upper compare value, i.e., a failure to determine an unavailability of the work queue to accept new tasks, no change is made to the value of the associated remote queue availability flag as a result of assigning this task to this processor. It is also to be noted that the above described processing will not change the value of the associated queue availability flag since the setting of the flag to "red" at 318 is only reached if the value of the flag was "green," as determined at 310. One embodiment operates to only "set" if the value is changed from green to red so as to not invalidate that value in the local cache memory of other processors. It is to be noted that embodiments of the present invention operate to only "set" the value of the queue availability flag when its value is to be changed and no "setting" operation is performed when the value is not to be changed to preclude invalidating the value of the queue availability flag in the local cache memory of other processors. In other words, if the value of the queue availability flag is already "red," the processing will not again set that value to "red." As a result of not modifying this value, other processors that had previously accessed this remote queue availability flag and have its value in their local cache are able to continue to use the locally cached value without triggering updates of their local caches through the shared memory access processing. This operation reduces the congestion that occurs in updating local caches through shared memory processing and increases throughput of a multiple processor system using shared memory, particularly as the number of processors sharing a shared memory structure becomes large.

Figure 4:
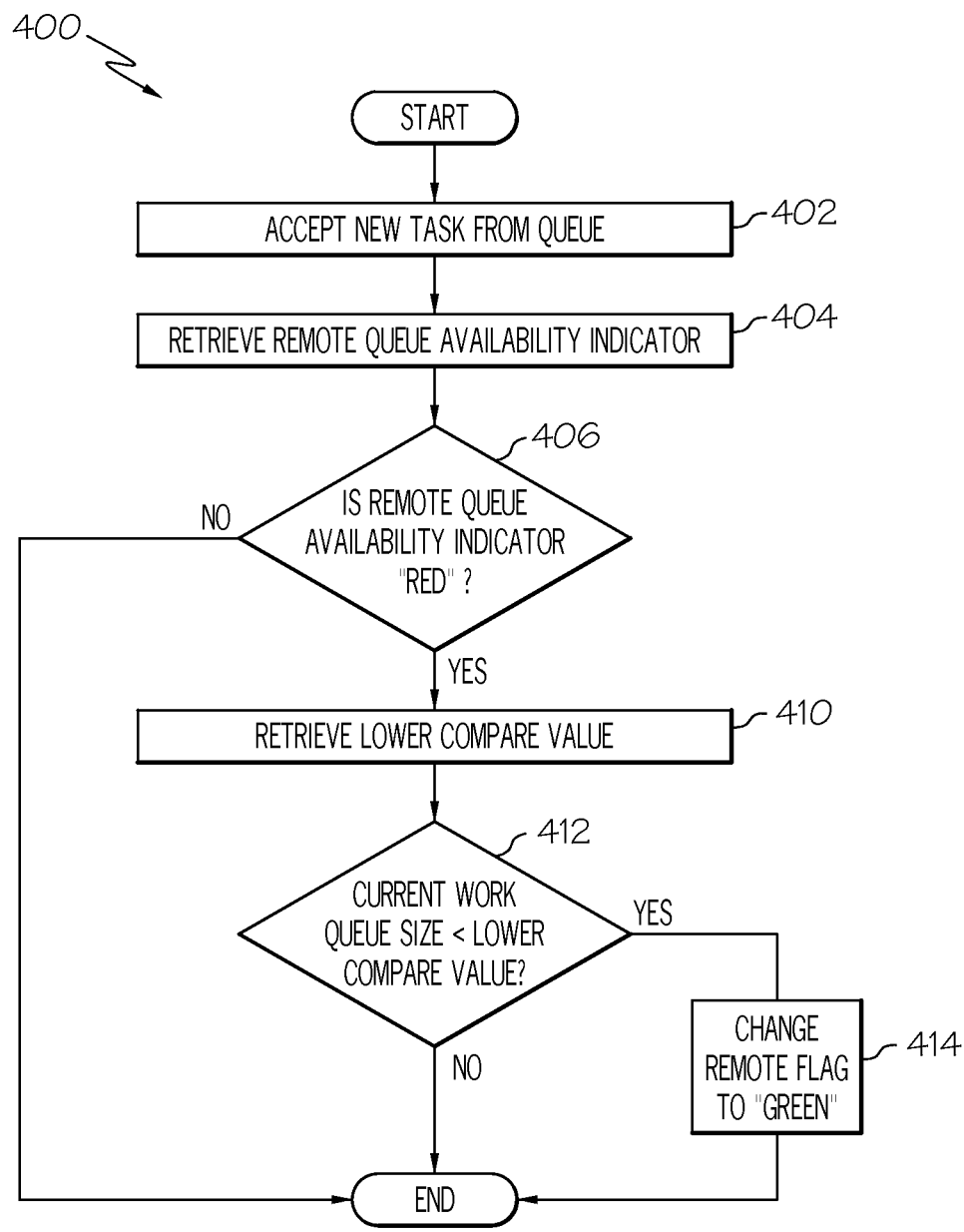
FIG. 4 illustrates a processing flow diagram for accepting a task from a processor associated work queue as shown in FIG. 1, according to one embodiment of the present invention.

FIG. 4 illustrates a processing flow diagram for accepting a task from a processor associated queue process 400 in a multiple processor system using shared memory 100 as shown in FIG. 1, according to one embodiment of the present invention. The accepting a task from a processor associated queue process 400 is embodied in one embodiment in a task acceptance processor program 174 and is executed by any processor within the multiple processors of a multiple processing system using shared memory, such as any of CPU 1 110, CPU 2 112 or CPU N 114 as described above. The processor executing the accepting a task from a processor associated queue 400 accepts, at 402, a task from its associated work queue, which in one embodiment is maintained in shared memory 102. In general, as is understood by practitioners of ordinary skill in the art in light of the present discussion, a particular CPU has associated processing to determine when a new task is to be accepted from its associated work queue and therefore when to begin this processing. The processing continues by retrieving, at 404, the remote queue availability flag from shared memory for the work queue associated with the processor performing the accepting a task from a processor associated queue process 400. It is to be noted that one embodiment of the present invention does not examine or modify the local queue availability flag for the processor performing this processing, but only examines and modifies the remote queue availability flag, which is the flag examined by other processors when determining whether or not to assign a task to this processor.

The processing proceeds to determine if the remote queue availability flag for this processor should change state based upon having the queued task removed. The processing determines, at 406, if the remote queue availability flag for the processor performing this processing is "red," and therefore indicates that the work queue is unavailable to accept new tasks. If the remote queue availability flag is not "red," no change of state of the remote queue availability flag is required and the processing terminates.

If the remote queue availability flag is "red," the processing retrieves, at 410, the lower compare value 148 from shared memory 102. As described above, the lower compare value is computed based upon the composite queue size 146. Computation of the lower compare value 148 in one embodiment is described below. In one embodiment, the mean queue size for all work queues is used as the lower compare value. Further embodiments are able to adjust the composite queue size 146 by any suitable method to derive a lower compare value. It is to be noted that the lower compare value 148 is only read during this process and not written, thereby preserving the validity of this value in the local caches of other processors. The processing then determines, at 412, if the current work queue size for the processor performing this processing is lower than the determined lower compare value. If the current work queue size is lower than the lower compare value, the processing changes, at 414, the remote queue availability flag from "red" to "green" to indicate that the work queue is able to accept new tasks. If the current work queue size is not lower than the lower compare value, the processing ends. It is to be noted that embodiments of the present invention operate to only "set" the value of the queue availability flag when its value is to be changed and no "setting" operation is performed when the value is not to be changed to preclude invalidating the value of the queue availability flag in the local cache memory of other processors. In other words, if the value of the queue availability flag is already "green," the processing will not again set that value to "green." It is to be noted that the value of the remote queue availability flag is only changed when required, and as discussed above values of this flag contained in the local cache of other processors will not be affected unless the determined ability of this work queue to accept tasks changes.

Figure 5:
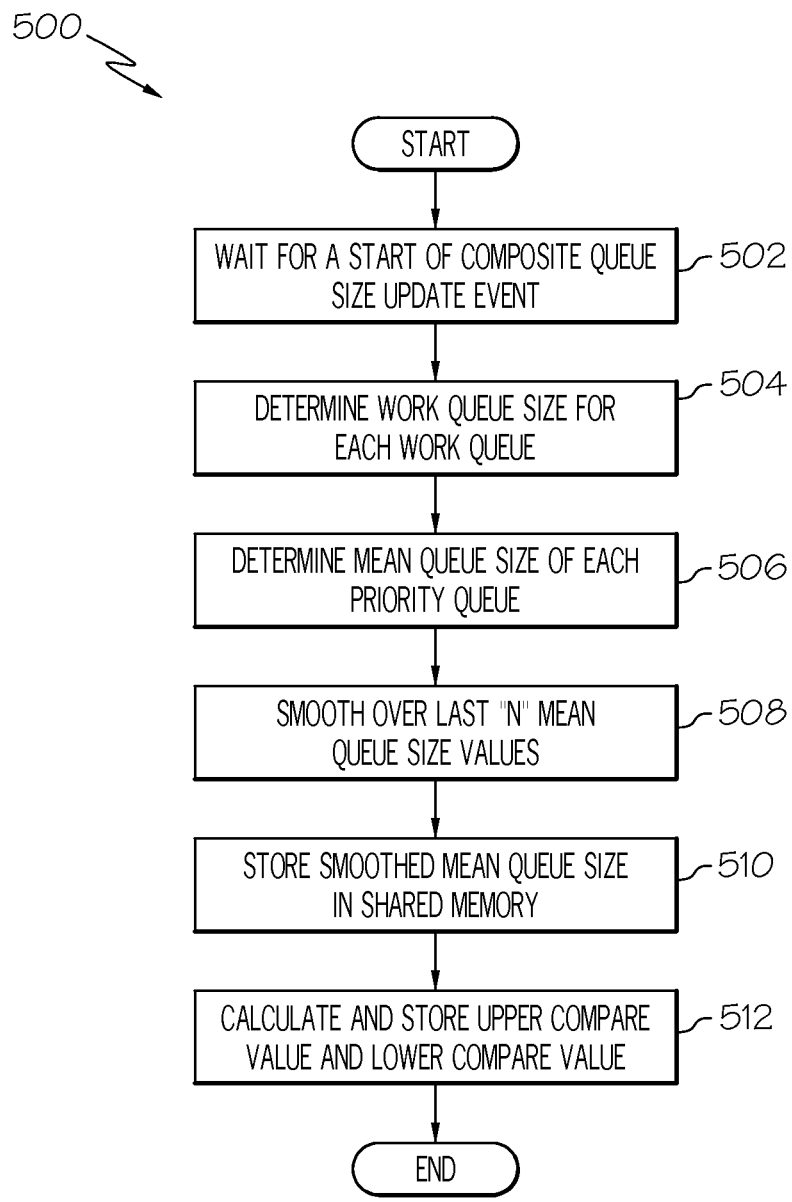
FIG. 5 is a processing flow diagram for updating a composite queue sizes for a multiple processor system as shown in FIG. 1, according to one embodiment of the present invention.

FIG. 5 is a processing flow diagram for updating composite queue sizes 500 for a multiple processor system 100 as shown in FIG. 1, according to one embodiment of the present invention. In various embodiments of the present invention, the updating composite queue sizes 500 is embodied in, for example, the composite queue size processor program 170 and is able to be performed by any processor within the multiple processors of a multiple processing system using shared memory, such as any of CPU 1 110, CPU 2 112 or CPU N 114 as described above. Various embodiments are able to, for example, configure one processor to always perform this processing, or the various iterations are able to be performed by various processors. In general, the updating composite queue sizes 500 is performed iteratively by one processor at each iteration.

The updating composite queue sizes 500 begins by waiting, at 502, for a start of composite queue size update event. Various embodiments of the present invention utilize different techniques to initiate each iteration of the updating a composite queue size 500. For example, one embodiment is able to use a processor's timing architecture to trigger iterations at a fixed or changing time interval. In one embodiment, a processor's timing interrupt is used to trigger processing at 50 mS intervals, resulting in the execution of the updating a composite queue size process 500 twenty times per second.

Once the start composite queue size update event occurs, the processing determines, at 504, the work queue size for each type of work queue within the set of work queues that are associated with the multiple processors, such as the size of in progress work queue and the size of the network message queue within the set of work queues 1 120, and for those two types of work queues within the set of work queues 2 122, and the set of work queues N 124. Multiple processor systems generally have established processing procedures to determine the size of each work queue. As discussed above, the "size" of a work queue is able to be based on any suitable measure, such as a raw count or tasks in the work queue or a weighted count based upon estimated resource requirements for each task.

The processing of one embodiment then determines, at 506, a mean work queue size for each type of work queue within the set of work queues, where the mean work queue size is equal to the mean of the sizes of all of that type of work queue as determined at 504. In an example where the set of work queues include an in progress work queue and a network message work queue, separate mean work queue values are determined for each of those two types of queues within all of the sets of work queues. Other suitable quantities to represent processor loading by queue size are alternatively able to be determined at this stage. The processing then smoothes, at 508, each of the mean work queue sizes over the last "N" mean queue size values. In one embodiment, a moving window average of the last "N" determined mean queue sizes, as determined during the last N iterations of the updating a composite queue size process 500, is used. The value of "N" is able to be chosen to be any practical value, such as 20. The smoothed mean work queue sizes for each type of queue within the set of work queues is then stored, at 510, into the shared memory 102 as the composite queue sizes 146. The processing then calculates, and stores, at 512, the upper compare value 147 and lower compare value 148 for each type of work queue within the set of work queues into shared memory 102. In an example where the set of work queues include an in progress work queue and a network message work queue, the upper compare values 147 contain a separate upper compare value for each of the in progress work queue and the network message work queue; and the lower compare values 148 contains a separate lower compare value for each of the in progress work queue and the network message work queue. It is to be noted that values of the upper compare values 147 and the lower compare values 148 are only written in during this process, and therefore are read-only for the above described processing depicted in FIGS. 2, 3 and 4. The processing then returns to wait, at 502, for the start composite queue size update event to occur and start a next iteration of the above described processing.

Information Processing System

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 6:
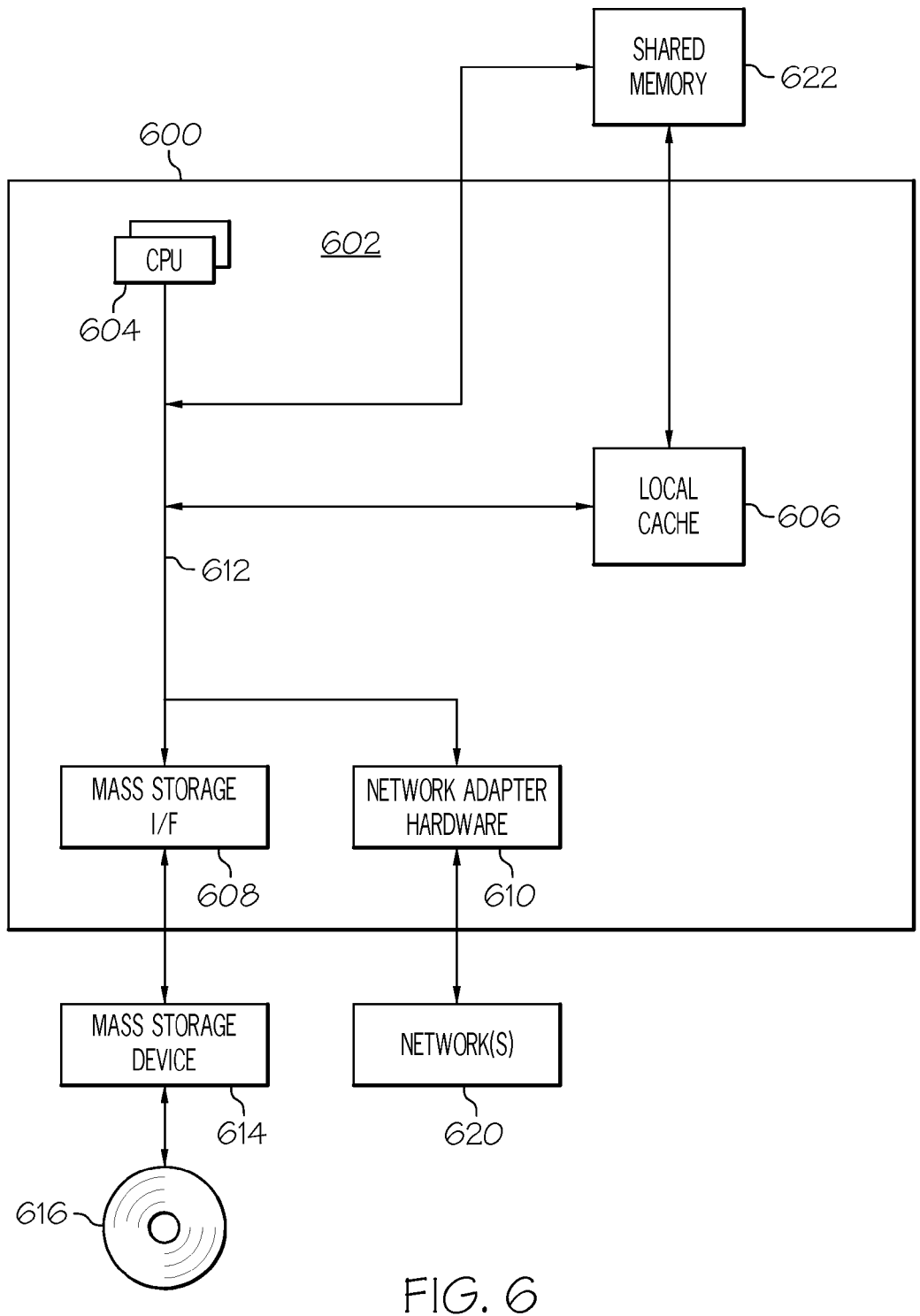
FIG. 6 is a block diagram illustrating an information processing system according to one embodiment of the present invention.

Referring now to FIG. 6, which is a block diagram illustrating an information processing system 600 that can be utilized in the operating environment 100 discussed above with respect to FIG. 1. The information processing system 600 is based upon a suitably configured processing system adapted to implement one or more embodiments of the present invention. Similarly, any suitably configured processing system can be used as the information processing system 600 by embodiments of the present invention.

The information processing system 600 includes a computer 602. The computer 602 has a processor(s) 604 that is connected to a local cache memory 606, shared memory 622, mass storage interface 608, and network adapter hardware 610. A system bus 612 interconnects these system components. The shared memory 622, in one embodiment, includes the composite queue size processor 170, the task distribution processor 172 and the task acceptance processor 174.

The mass storage interface 608 is used to connect mass storage devices, such as data storage device 614, to the information processing system 600. One specific type of data storage device is an optical drive such as a CD/DVD drive, which may be used to store data to and read data from a computer readable medium or storage product such as (but not limited to) a CD/DVD 616. Another type of data storage device is a data storage device configured to support, for example, NTFS type file system operations.

An operating system (not shown) included in the shared memory 622 is a suitable multitasking operating system such as the Linux, UNIX, Windows XP, and Windows Server 2003 operating system. Embodiments of the present invention are able to use any other suitable operating system. Some embodiments of the present invention utilize architectures, such as an object oriented framework mechanism, that allows instructions of the components of operating system (not shown) to be executed on any processor located within the information processing system 600. The network adapter hardware 610 in one embodiment is part of a network interface 160 and provides network communications interfaces to one or more networks 620. Embodiments of the present invention are able to be adapted to work with any data communications connections including present day analog and/or digital techniques or via a future networking mechanism.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Non-Limiting Examples

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments, and it is intended that the appended claims cover any and all such applications, modifications, and embodiments within the scope of the present invention.

What is claimed is:

1. A method for selecting a work queue associated with a processor within a multiple processor architecture to assign a new task, the method comprising:
   maintaining, within a shared random access memory, a plurality of queue availability flag pairs,
      wherein each queue availability flag pair within the plurality of queue availability flag pairs is associated with a respective associated work queue within a plurality of work queues,
      each queue availability flag pair comprising a respective local queue availability flag and a respective remote queue availability flag,
      the respective local queue availability flag and the respective remote queue availability flag of a respective queue availability flag pair each indicating an availability to accept a new task of the respective associated work queue that is associated with the respective queue availability flag pair;
   determining, on a local processor based on at least one flag within the plurality of queue availability flag pairs, an availability of a selected work queue associated with a selected processor to accept a new task, wherein the local processor and the selected processor are within a multiple processor architecture and access the shared random access memory;
   assigning, in response to determining the availability, the new task to the selected work queue;
   determining that the selected processor is the local processor;
   updating, in response to determining that the selected processor is not the local processor, a selected remote queue availability flag, based upon a size of the work queue associated with the selected processor, wherein the selected remote queue availability flag is a remote queue availability flag of a queue availability flag pair associated with the selected work queue; and
   determining, in response to determining that selected processor is the local processor and in response to assigning the new task, to not change any flag within the plurality of queue availability flag pairs,
   wherein the determining not to change any flag is independent of a size of the selected work queue.

2. The method of claim 1, further comprising:
   iteratively determining a composite queue size for a plurality of work queues associated with a respective plurality of processors in the multiple processor architecture, wherein the plurality of work queues are all of one type;
   wherein the updating the remote queue availability flag of a queue availability flag pair associated with the selected work queue further comprises:
      determining, based upon the composite queue size, a lack of a change of status of the selected work queue to accept the new task;
      determining, in response to determining a lack of a change in status, to not write a first value to the selected remote queue availability flag so as to not alter data validity, with respect to the shared random access memory, of the selected remote queue availability flag within the shared random access memory and within a local cache of the local processor, and the first value indicating an availability to accept new tasks;
      determining a change in status of the selected work queue; and
      in response to determining a change in status of the selected work queue, writing a second value to the selected remote queue availability flag, the second value being different than the first value, the second value indicating an unavailability to accept new tasks.

3. The method of claim 1, wherein each respective local queue availability flag and each respective remote queue availability flag of each queue availability flag pair is stored in a respective separate cache line within the shared random access memory.

4. The method of claim 1, and wherein determining the availability comprises:
- determining that the selected processor is the local processor;
- examining, in response to determining that the selected processor is not the local processor, the remote queue availability flag for the selected processor; and
- examining, in response to determining that the selected processor is the local processor, the local queue availability flag for the selected processor.

5. The method of claim 1, further comprising:
- accepting, by the local processor, a task to execute from the work queue associated with the local processor;
- updating, in response to the accepting the task, the remote queue availability flag based upon a size of the work queue associated with the local processor; and
- not updating, in response to the accepting the task and independently of a size of the selected work queue, the local queue availability flag.

6. The method of claim 5, further comprising iteratively updating, based upon a size of the work queue associated with the local processor at a time of each iterative execution, the local queue availability flag wherein the iteratively updating is performed at times unrelated to the accepting the task.

7. The method of claim 6, further comprising:
- iteratively determining, at a period independent of the iteratively updating, a composite queue size for a plurality of work queues associated with a respective plurality of processors in the multiple processor architecture, wherein the plurality of work queues are all of one type;
- wherein the iteratively updating the local queue availability flag comprises:
  - deriving an upper compare value based upon the composite queue size;
  - comparing a size of a work queue for the selected processor to the upper compare value; and
  - setting, in response to the comparing indicating the size of the work queue for the selected processor is greater than the upper compare value, the local queue availability flag to indicate that the work queue associated with the local processor is not available to accept new tasks.

8. The method of claim 5, wherein the iteratively updating is performed at random time intervals.

9. A system for selecting a work queue associated with a processor within a multiple processor architecture to assign a new task, the system comprising:
- a plurality of processors;
- a shared random access data memory communicatively coupled to the plurality of processors; and
- a task distribution processor capable of:
  - maintaining, within the shared random access memory, a plurality of queue availability flag pairs,
  - wherein each queue availability flag pair within the plurality of queue availability flag pairs is associated with a respective associated work queue within a plurality of work queues,
  - each queue availability flag pair comprising a respective local queue availability flag and a respective remote queue availability flag,
  - the respective local queue availability flag and the respective remote queue availability flag of a respective queue availability flag pair each indicating an availability to accept a new task of the respective associated work queue that is associated with the respective queue availability flag pair;
  - determining, on a local processor based on at least one flag within the plurality of queue availability flag pairs, an availability of a selected work queue associated with a selected processor to accept a new task, wherein the local processor and the selected processor are within a multiple processor architecture and access the shared random access data memory;
  - assigning, in response to determining the availability, the new task to the selected work queue;
  - determining that the selected processor is the local processor;
  - updating, in response to determining that the selected processor is not the local processor, a selected remote queue availability flag, based upon a size of the work queue associated with the selected processor, wherein the selected remote queue availability flag is a remote queue availability flag of a queue availability flag pair associated with the selected work queue; and
  - determining, in response to determining that selected processor is the local processor and in response to assigning the new task, to not change any flag within the plurality of queue availability flag pairs,
  - wherein the determining not to change any flag is independent of a size of the selected work queue.

10. The system of claim 9, further comprising:
- a composite queue size processor capable of iteratively determining a composite queue size for all work queues associated with all processors in the multiple processor architecture, wherein the plurality of work queues are all of one type;
- wherein the task distribution processor is capable of updating the remote queue availability flag of a queue availability flag pair associated with the selected work queue by:
  - determining, based upon the composite queue size, a lack of a change of status of the selected work queue to accept the new task;
  - determining, in response to determining a lack of a change in status, to not write a first value to the selected remote queue availability flag so as to not alter data validity, with respect to the shared random access memory, of the selected remote queue availability flag within the shared random access memory and within a local cache of the local processor, and the first value indicating an availability to accept new tasks;
  - determining a change in status of the selected work queue; and
  - in response to determining a change in status of the selected work queue, writing a second value to the selected remote queue availability flag, the second value being different than the first value, the second value indicating an unavailability to accept new tasks.

11. The system of claim 9, wherein each respective local queue availability flag and each respective remote queue availability flag of each queue availability flag pair is stored in a respective separate cache line within the shared random access data memory.

12. The system of claim 9, and wherein the task distribution processor is capable of determining the availability by:
- determining that the selected processor is the local processor;
- examining, in response to determining that the selected processor is not the local processor, the remote queue availability flag for the selected processor; and examining, in response to determining that the selected processor is the local processor, the local queue availability flag for the selected processor.

13. The system of claim 9, further comprising a task acceptance processor capable of:
   accepting, by the local processor, a task to execute from the work queue associated with the local processor;
   updating, in response to the accepting the task, the remote queue availability flag based upon a size of the work queue associated with the local processor; and
   not updating, in response to the accepting the task and independently of a size of the selected work queue, the local queue availability flag.

14. The system of claim 13, further comprising a local flag maintenance processor capable of iteratively updating, based upon a size of the work queue associated with the local processor at a time of each iterative execution, the local queue availability flag wherein the local flag maintenance processor performs the iterative updating at times unrelated to the accepting the task by the task acceptance processor.

15. The system of claim 14, further comprising:
   a composite queue size processor capable of iteratively determining at a first interval, a composite queue size for all work queues associated with all processors in the multiple processor architecture, wherein the plurality of work queues are all of one type, and
   wherein the task distribution processor is further capable of iteratively updating, at a second interval independent of the first interval, the local queue availability flag by:
   deriving an upper compare value based upon the composite queue size;
   comparing a size of a work queue for the selected processor to the upper compare value; and
   setting, in response to the comparing indicating a size of a work queue is greater than the upper compare value, the local queue availability flag to indicate that the work queue associated with the local processor is not available to accept new tasks.

16. The system of claim 15, wherein at least one of the first interval and the first interval comprise random time intervals.

17. A computer program product for selecting a work queue associated with a processor within a multiple processor architecture to assign a new task, the computer program product comprising:
   a non-transitory computer readable storage medium having computer readable program code embodied therewith, the computer readable program code comprising:
   computer readable program code configured to maintain, within a shared random access memory, a plurality of queue availability flag pairs,
      wherein each queue availability flag pair within the plurality of queue availability flag pairs is associated with a respective associated work queue within a plurality of work queues,
      each queue availability flag pair comprising a respective local queue availability flag and a respective remote queue availability flag,
      the respective local queue availability flag and the respective remote queue availability flag of a respective queue availability flag pair each indicating an availability to accept a new task of the respective associated work queue that is associated with the respective queue availability flag pair;
   computer readable program code configured to determine, on a local processor based on at least one flag within the plurality of queue availability flag pairs, an availability of a selected work queue associated with a selected processor to accept a new task, wherein the local processor and the selected processor are within a multiple processor architecture and access the shared random access;
   computer readable program code configured to assign, in response to determining the availability, the new task to the selected work queue;
   computer readable program code configured to determine that the selected processor is the local processor;
   computer readable program code configured to update, in response to determining that the selected processor is not the local processor, a selected remote queue availability flag, based upon a size of the work queue associated with the selected processor, wherein the selected remote queue availability flag is a remote queue availability flag of a queue availability flag pair associated with the selected work queue; and
   computer readable program code configured to determine, in response to determining that selected processor is the local processor and in response to assigning the new task, to not change any flag within the plurality of queue availability flag pairs, wherein the determining not to change any flag is independent of a size of the selected work queue.

18. The method of claim 2, further comprising determining, for each work queue in the plurality of work queues, a respective associated work queue size,
   wherein determining the composite queue size comprises determining one of an average of a total of tasks assigned to the plurality of work queues and a mean of a total of tasks assigned to the plurality of work queues,
   and wherein the composite queue size is the one of the average and the mean of all respective associated work queue sizes.

19. The method of claim 2, further comprising:
   determining a lower compare value based upon the composite queue size; and
   beginning processing, by the selected processor, of a task,
   wherein determining the lack of a change of status comprises
      determining, in response to the beginning processing, that the selected work queue has a size not less than the lower compare value, and
      determining, in response to the beginning processing, that the selected queue availability flag is in a second state, and
   wherein determining a change in status comprises determining, in response to the beginning processing, that at least one flag within the queue availability flag pair associated with the selected work queue is in the second state and that the selected work queue has a size lower than the lower compare value.

20. The method of claim 2,
   wherein the determining the availability of the selected work queue comprises determining that that at least one flag within the queue availability flag pair associated with the selected work queue is in a first state,
   wherein determining a lack of a change of status comprises:
      determining an upper compare value based upon the composite queue size;
      determining, in response to the assigning the new task, that the selected work queue has a size not greater than the upper compare value; and determining, in response to the assigning the new task, that the at least one flag within the queue availability flag pair associated with the selected work queue is in the first state, and
wherein determining a change in status comprises determining, in response to assigning the new task to the selected work queue,
that the at least one flag within the queue availability flag pair associated with the selected work queue is in the first state, and
that the selected work queue has a size greater than the upper compare value.

* * * * *